United States Patent
Park et al.

(10) Patent No.: US 10,437,117 B2
(45) Date of Patent: Oct. 8, 2019

(54) LIQUID-CRYSTAL DISPLAY DEVICE

(71) Applicant: LG DISPLAY CO., LTD., Seoul (KR)

(72) Inventors: JeongHwan Park, Gyeongsangbuk-do (KR); Jongha Kim, Paju-si (KR); HongYun Kang, Incheon (KR)

(73) Assignee: LG DISPLAY CO., LTD., Seoul (KR)

( * ) Notice: Subject to any disclaimer, the term of this patent is extended or adjusted under 35 U.S.C. 154(b) by 68 days.

(21) Appl. No.: 15/189,908

(22) Filed: Jun. 22, 2016

(65) Prior Publication Data

US 2016/0377944 A1  Dec. 29, 2016

(30) Foreign Application Priority Data

Jun. 25, 2015 (KR) .................. 10-2015-0090606

(51) Int. Cl.
  *G02F 1/1345* (2006.01)
  *G02F 1/1339* (2006.01)
  *G02F 1/1362* (2006.01)
  *G02F 1/1335* (2006.01)

(52) U.S. Cl.
  CPC ...... *G02F 1/1345* (2013.01); *G02F 1/133512* (2013.01); *G02F 1/1339* (2013.01); *G02F 2001/13629* (2013.01); *G02F 2203/01* (2013.01)

(58) Field of Classification Search
  CPC ............. G02F 1/1345; G02F 1/133512; G02F 1/1339; G02F 2001/13456; G02F 1/13452; G03F 7/70275
  See application file for complete search history.

(56) References Cited

U.S. PATENT DOCUMENTS

| | | | | |
|---|---|---|---|---|
| 6,424,394 | B1* | 7/2002 | Morii | G02F 1/133512 349/110 |
| 2004/0135941 | A1* | 7/2004 | Nam | G02F 1/133512 349/110 |
| 2008/0143945 | A1* | 6/2008 | Jeong | G02F 1/1339 349/139 |
| 2009/0195738 | A1* | 8/2009 | Yamada | G02F 1/1339 349/110 |
| 2013/0335690 | A1* | 12/2013 | Fujiwara | G02F 1/1339 349/153 |

FOREIGN PATENT DOCUMENTS

| | | |
|---|---|---|
| CN | 1624546 A | 6/2005 |
| CN | 1721957 A | 1/2006 |
| CN | 101071236 A | 11/2007 |
| CN | 102914914 A | 2/2013 |
| CN | 103048828 A | 4/2013 |

* cited by examiner

*Primary Examiner* — Michael H Caley
*Assistant Examiner* — Jonathan Y Jung
(74) *Attorney, Agent, or Firm* — Birch, Stewart, Kolasch & Birch, LLP

(57) ABSTRACT

Provided is a liquid-crystal display (LCD) device which can include a thin-film transistor (TFT) array substrate, a color filter substrate, and a sealant for attaching the TFT array substrate and the color filter substrate together. The TFT array substrate may include a plurality of conductive lines extended below the sealant, and the conductive lines may have transmissive portions through which UV light irradiated to cure the sealant is allowed to pass.

12 Claims, 8 Drawing Sheets

LIQUID-CRYSTAL DISPLAY DEVICE

CROSS-REFERENCE TO RELATED APPLICATIONS

This application claims the priority of Korean Patent Application No. 10-2015-0090606 filed on Jun. 25, 2015, in the Korean Intellectual Property Office, the disclosure of which is incorporated herein by reference.

BACKGROUND OF THE INVENTION

Technical Field

The present disclosure relates to a liquid-crystal display (LCD) device and a structure thereof.

Description of the Related Art

Liquid-crystal display (LCD) devices are advantageous in that they have a large contrast ratio, are appropriate for displaying moving pictures and consume less power. For these reasons, LCD devices are employed in various fields such as laptop computers, monitors, TVs, etc. Liquid crystals have optical anisotropy such that the molecular structure is long and thin and is arranged with directivity. Further, liquid crystals have a polarization property such that the orientation of the molecules is changed due to electric fields in proportion to the intensity. LCD devices utilize the optical anisotropy and the polarization property to display images.

Typically, an LCD device includes a liquid-crystal panel formed by interposing a liquid-crystal layer between two substrates facing each other. Electrodes are formed in the two substrates, and when electric field is applied across the two substrates, the orientation of the liquid-crystal molecules are changed by the electric field, thereby creating differences in optical transmittance.

Such differences in the optical transmittance allow the light supplied from a backlight behind the liquid-crystal panel to pass therethrough. The light supplied from the backlight then passes through a color filter such that a color image is displayed as a color combination produced by the color filter is created.

Typically, processes of fabricating an LCD device include a process of fabricating an array substrate and a color filter substrate respectively, a cell process of completing a liquid-crystal panel, and a module process of integrating the LCD panel with a backlight.

During the process of completing the LCD panel, a sealant is formed along the periphery of the substrate in order to attach the array substrate and the color filter substrate together. The sealant also acts to maintain the cell gap between the substrates. In order to ensure reliability of a liquid-crystal panel, it is important to correctly cure the sealant, as well as reducing the time taken in doing so.

SUMMARY OF THE INVENTION

An object of the present disclosure is to provide a liquid-crystal display (LCD) device. More specifically, an object of the present disclosure is to provide a liquid-crystal display (LCD) device employing a structure capable of curing a sealant more efficiently.

According to an embodiment of the present disclosure, there is provided a thin-film transistor (TFT) array substrate. The TFT array substrate includes an active area where images are displayed and a peripheral area around the active area; and conductive lines configured to transfer signals associated with image displaying are stacked in multiple layers in the peripheral area. A first conductive line in a first layer among the multiple layers has a transmissive area having a shape corresponding to an arrangement of a second conductive line in a second layer below the first layer.

According to another embodiment of the present disclosure, there is provided a liquid-crystal display (LCD) device according to another exemplary embodiment of the present disclosure. The LCD device may include a thin-film transistor (TFT) array substrate; a color filter substrate; and a sealant that attaches the TFT array substrate and the color filter substrate together. The TFT array substrate may include a plurality of conductive lines extended below the sealant, and the conductive lines may have transmissive portions through which UV light irradiated to cure the sealant is allowed to pass.

According to exemplary embodiments of the present disclosure, there is provided a structure capable of curing a sealant of an LCD device more efficiently. According to exemplary embodiments of the present disclosure, a space where UV light can be transmitted for curing a sealant can be obtained maximally even in a display device with a narrow bezel. As a result, defects in the display device caused when the sealant is not cured sufficiently can be reduced.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE PREFERRED EMBODIMENTS

Figure 1:
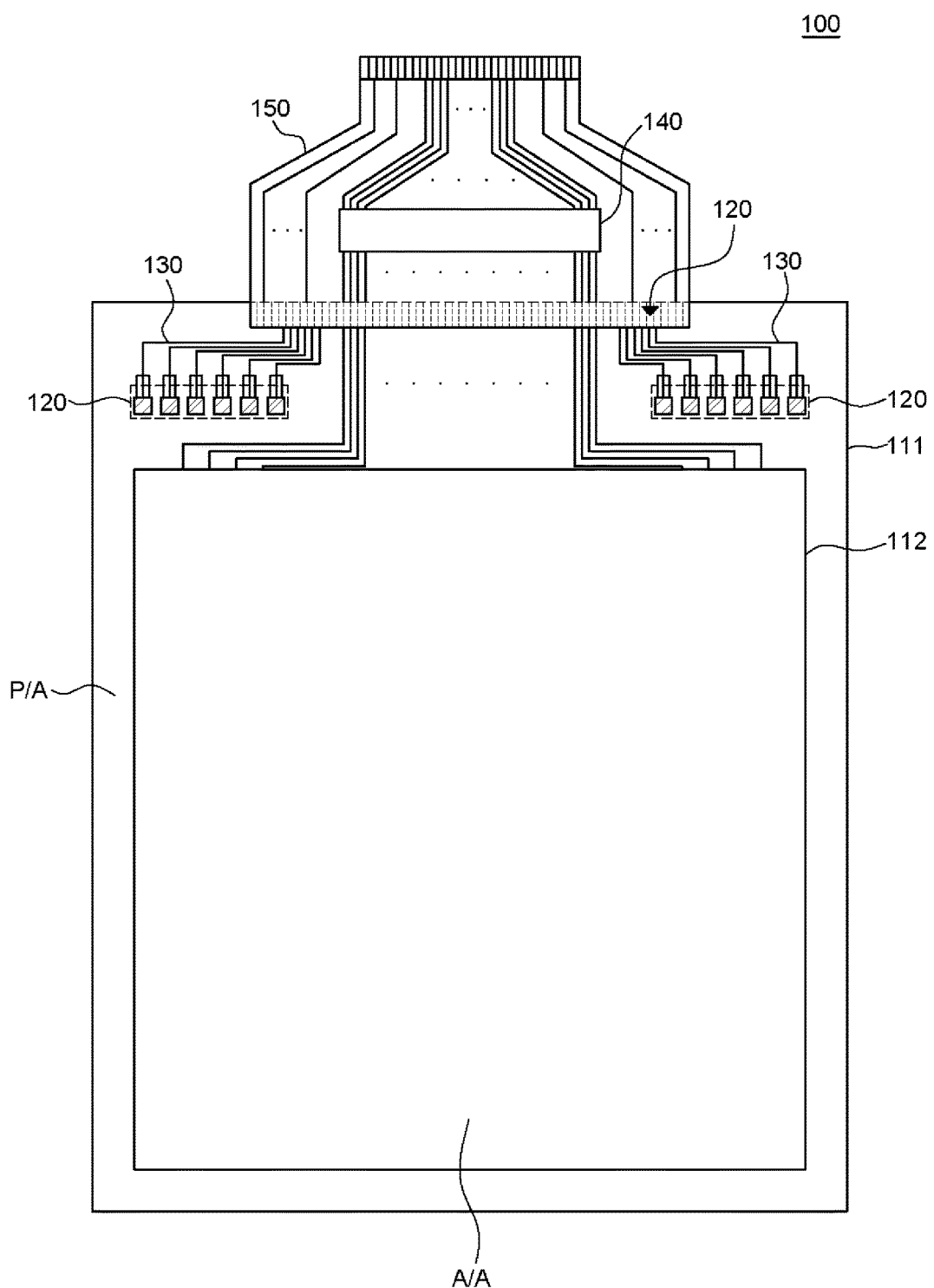
FIG. 1 is a plan view of an LCD device according to an exemplary embodiment of the present disclosure.

In describing components of exemplary embodiments of the present disclosure, terms such as first, second, A, B, (a), (b), etc., may be used. These terms are used only to differentiate the components from other components. Therefore, the nature, sequence, order, number, etc., of the components are not limited by these terms. As used herein, phrases "an element A connected to an element B" or "an element A coupled with an element B" refer to that the element A may be directly connected to/coupled with the element B, that another element C may be interposed between the element A and the element B, and/or that the element A may be indirectly connected to/coupled with the element B via another element C. As used herein, a phrase "an element A on an element B" refers to that the element A may be disposed directly on the element B and/or the element A may be disposed indirectly on the element B via another element C. The drawings are not to scale and the relative dimensions of various elements in the drawings are depicted schematically and not necessarily to scale.

Features of various exemplary embodiments of the present disclosure may be combined partially or totally. As will be clearly appreciated by those skilled in the art, technically various interactions and operations are possible. Various exemplary embodiments can be practiced individually or in combination. Hereinafter, exemplary embodiments of the present disclosure will be described in detail with reference to the accompanying drawings.

FIG. 1 is a plan view of an LCD device according to an exemplary embodiment of the present disclosure. All the components of the LCD device according to all embodiments of the present disclosure are operatively coupled and configured.

The LCD device 100 may include a thin-film transistor (TFT) array substrate 111, a color filter substrate 112, a driving circuit 140, a connection member 150, etc. A liquid-crystal layer is interposed between the TFT array substrate 111 and the color filter substrate 112.

In the area where the TFT array substrate 111 and the color filter substrate 112 are attached together, an active area A/A where images are displayed is formed. In a portion of the TFT array substrate 111 that corresponds to the active area, a plurality of thin-film transistors TFTs and a plurality of lines (gate lines, data lines, etc.) electrically connected to the thin-film transistors are disposed. Red, blue and green color filters are disposed in the portion of the color filter substrate 112 that corresponds to the active area.

A peripheral area P/A is formed around the active area A/A. In the peripheral area P/A, a pad unit 120 and a plurality of conductive lines 130 are disposed. The pad unit 120 consists of a plurality of pads or terminals, each connected to respective lines extended to the active area.

The driving circuit 140 is placed on the connection member 150 to be connected to the pad unit 120 and controls the LCD device. That is, the driving circuit 140 transfers to the display device gate signals and/or data signals and control signals for timely applying of the signals.

The connection member 150 is connected to the pad unit 120 on the TFT array substrate 111. The connection member 150 includes a plurality of lines such that signals generated from external circuits are transferred to the driving circuit 140 via the lines. In addition, in some cases, a plurality of electronic components may be mounted on the connection member 150, and signals generated by the electronic components may be transferred to the driving circuit 140. The connection member 150 may be implemented as, but is not limited to, a flexible cable, a flexible printed circuit board (FPCB) and so on.

The above-described elements can be accommodated in a top cover or a bottom cover, for example. In addition, a backlight unit for supplying light may be disposed under or adjacent to the TFT array substrate 111.

The TFT array and the color filters on the respective substrates may be implemented by processes such as thin-film deposition, photo-lithography, etching, etc. In a later process, a seal pattern (or sealant) is formed on the TFT array substrate 111 or the color filter substrate 112 for attaching the substrates together. The two substrates are attached together with the liquid-crystal layer therebetween, thereby forming a liquid-crystal panel. A polarization plate, the driving circuit and the like are attached to the liquid-crystal panel, which is then integrated with the backlight unit to complete an LCD device.

The sealant for attaching the color filter substrate and the TFT array substrate together may be a heat-curable resin that is cured by heat or a UV-curable resin that is cured by UV light. The UV-curable resin may include monomers containing a photoinitiator and a UV-curing agent and glass fiber for maintaining a cell gap in the monomers. After the sealant is applied on the periphery of at least one of the two substrates, liquid crystals are injected between the two substrates and UV light is irradiated by a mercury lamp or a metal halide lamp, such that the sealant is cured and the two substrates are attached to each other.

Figure 2:
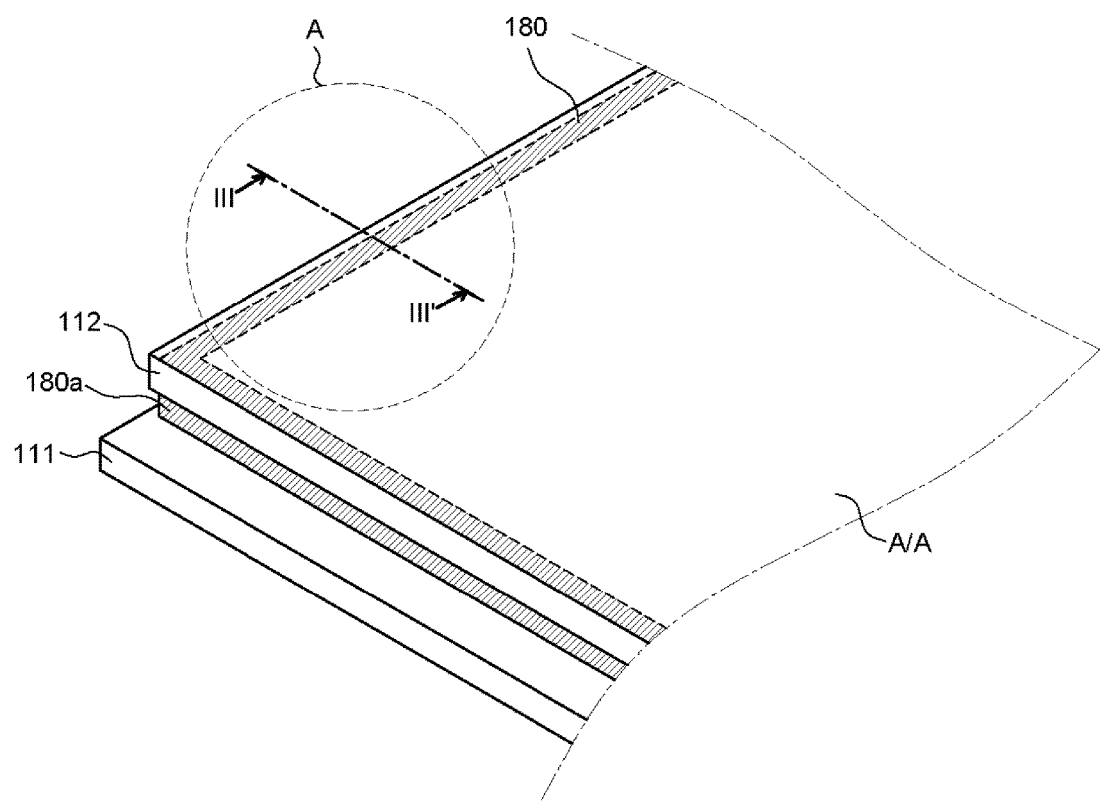
FIG. 2 is a perspective view of an LCD device according to an exemplary embodiment of the present disclosure.

FIG. 2 is a perspective view of an LCD device according to an exemplary embodiment of the present disclosure.

The LCD device 100 may include a first substrate 111 and a second substrate 112. The first substrate 111 may be a TFT array substrate, and the second substrate 112 may be a color filter substrate. A sealant 180a for attaching the first substrate 111 and the second substrate 112 together is located therebetween. The sealant 180a may be located along the edges of the two substrates.

Gate lines, data lines and thin-film transistors may be disposed on the first substrate 111. Then, a pixel electrode is disposed in a region defined by the gate lines and the data lines to form a unit pixel. Color filters for producing colors and a black matrix for preventing the colors from being mixed with one another may be disposed on the second substrate 112.

If the first substrate 111 is larger than the second substrate 112, the pad unit 120 to which the driving circuit is connected is disposed on one side of the first substrate 111. In addition, a circuit area is formed along a surface in contact with the pad unit 120. Conductive lines (e.g., electric wires) are provided in the pad unit 120 that transfer signals from the driving circuit to a driving element in the active area A/A. The driving circuit may be placed in a tape carrier package (TCP) manner and may be connected to the pad unit 120 on the first substrate 111 in a tape automated bonding (TAB) manner. In the circuit area, circuit lines for supplying gate signals to the gate lines may be disposed.

Figure 3A:
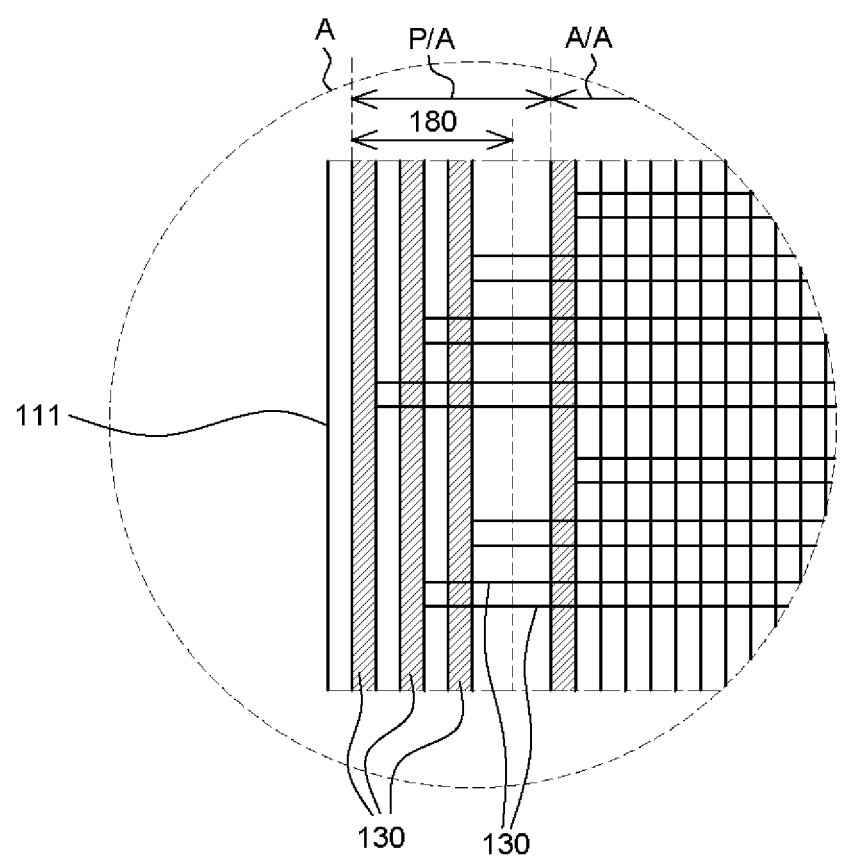
FIG. 3A is an enlarged view of a portion of a lower surface in area A shown in FIG. 2.
Figure 3B:
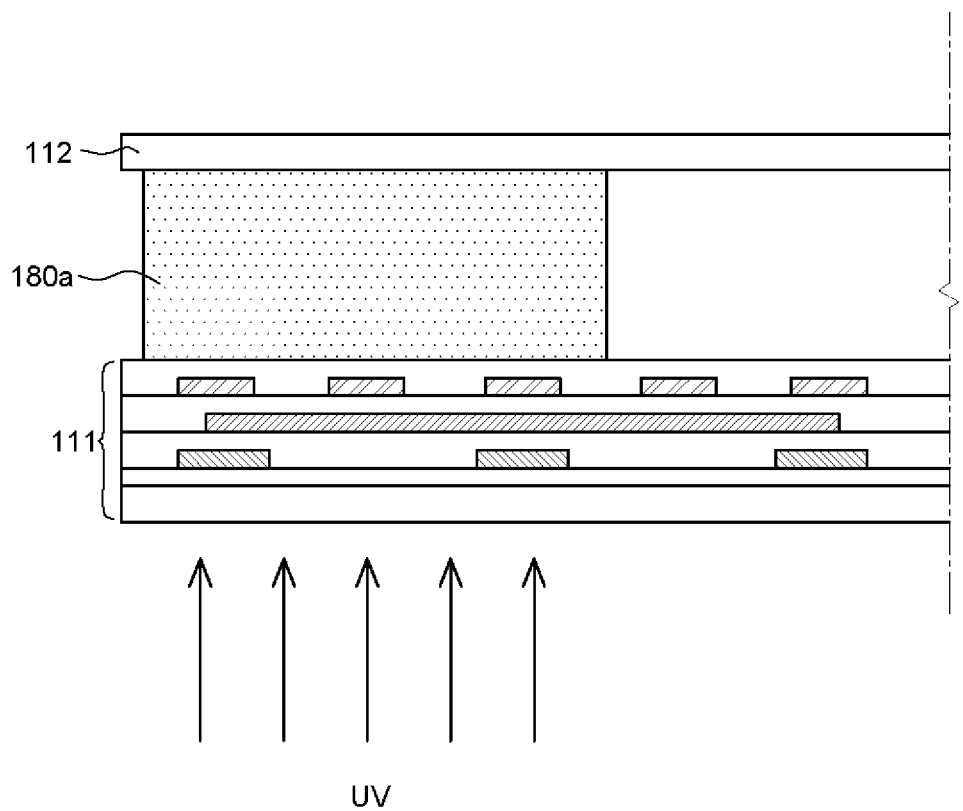
FIG. 3B is a cross-sectional view cut along line III-III of area A shown in FIG. 2.

FIG. 3A is an enlarged view of a portion of the first substrate in area A shown in FIG. 2. FIG. 3B is a cross-sectional view cut along line III-III of area A shown in FIG. 2.

As shown in FIG. 3A, a plurality of circuit lines (conductive lines) 130 is disposed in the peripheral area P/A of the first substrate 111 of the LCD panel. It is to be noted that in order to reduce the size (i.e., width) of the bezel (i.e., non-display area at an outer boundary, periphery, frame, rim, etc.) of the LCD device, a seal area 180 where the sealant 180a is applied is formed in the peripheral area P/A. The first substrate 111 is attached to the second substrate 112 to thereby form the LCD device 100.

The sealant 180a is used for attaching the two substrates 111 and 112 together. The sealant 180a is located in the seal area 180. By locating the seal area 180 on the peripheral area P/A, the width of a non-active area can be reduced and thus it is advantageous for reducing the size of the LCD device 100.

The sealant 180a formed by curing a curable resin by heat or UV light is used to attach the two substrates 111 and 112 together. For example, the sealant 180a may be formed by applying heat to a heat-curable resin to bake it or by pressing it to generate heat. However, while applying heat or pressure, fine metal conductive lines and circuit lines in the peripheral area P/A may be affected by the heat or pressure, thereby causing defects in the LCD device 100.

Alternatively, the sealant 180a may be formed by applying UV light energy to a UV-curable resin. The UV-curable resin can be cured in a relatively short period of time by chemical reaction with UV light. By using the UV-curable resin, energy can be saved and productivity can be improved. That is, since the UV-curable resin can be cured in a short period of time, it has advantages in that its productivity can be improved and it can be cured at a low temperature. In addition, the UV-curable resin does not require baking during a curing process, it consumes less energy and thus the cost for energy can be saved. Accordingly, irradiating UV light onto a UV-curable resin is frequently used for forming the sealant 180a. The UV-curable resin may contain photopolymerization initiator and photo polymeric monomer as materials for UV curing. The UV-curable resin may have one to several alkyl groups (acryloyl) as functional groups, and it causes polymerization reactions with the photo polymeric monomer and the photoinitiator to be cross-linked, thereby becoming a polymer. The photopolymerization initiator is activated upon receiving UV light, and unsaturated group component receives activation energy of the photopolymerization initiator to initiate polymerization. That is, the UV light curing reaction may include processes that the photopolymerization initiator absorbs the energy of the irradiated UV light to generate pre-radicals (i.e., free radicals) that react with the UV-curable resin or the reaction group of the photopolymerization monomer to initiate polymerization. Then, the growth reactions and chain transfer reactions are repeated in series and are terminated with the termination reaction. These processes are performed instantaneously such that a cured film having a three-dimensional molecular network structure is formed.

In order to cure a UV-curable resin, UV light is irradiated from below and towards the first substrate 111 as shown in FIG. 3B. Since the black matrix is formed in the area of the second substrate 112 where the UV-curable resin is disposed, the UV light cannot permeate from the second substrate 112.

As shown in FIG. 3B, the plurality of circuit lines (conductive lines) 130 is disposed on the first substrate 111, and the sealant 180a overlaps the circuit lines 130. Therefore, the UV light may not be irradiated onto the UV-curable resin sufficiently. That is, UV light is reflected off the circuit lines 130 such that the UV light may fail to reach portions of the curable resin hidden by the conductive lines. Accordingly, some portions of the UV-curable resin may not be properly cured. If the time to irradiate UV light is increased to sufficiently cure the UV-curable resin in view of such circuit lines 130, the tact time is increased and thus production efficiency is reduced.

Figure 4:
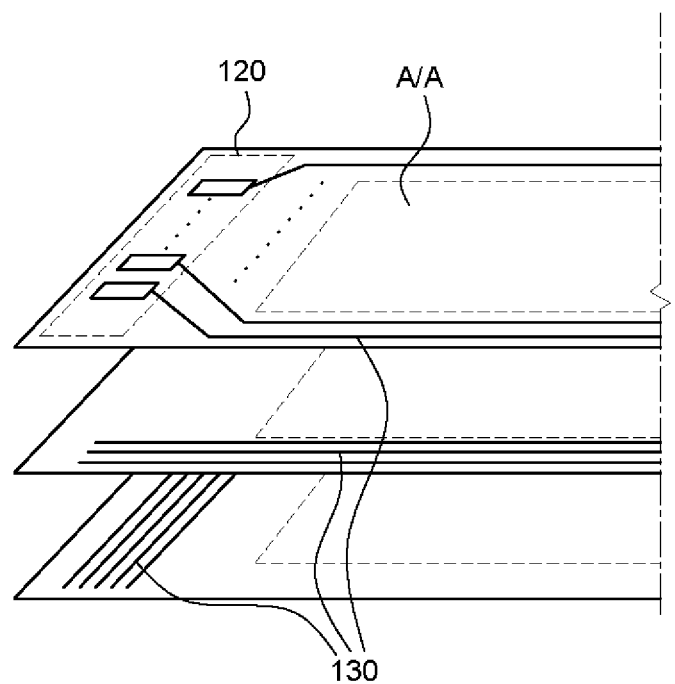
FIG. 4 is a diagram showing a layout of conductive lines in a peripheral area according to an exemplary embodiment of the present disclosure.

FIG. 4 is a diagram showing a layout of conductive lines in the peripheral area according to an exemplary embodiment of the present disclosure.

As recent display devices have higher resolution and more functions, more and more electric lines (conductive lines) for transferring driving signals and/or various control signals are disposed, whereas the bezels of the display devices should be minimized due to design requirements for the final product that implements such display devices. As a result, there may not be sufficient space for disposing numerous connection lines in the bezel area having very limited space, and thus the electric lines may need to be arranged at a narrow spacing therebetween or in multiple layers stacked onto each other. In addition, the electric lines may be extended in different directions, which also cause difficulties in implementation.

For example, as shown in FIG. 4, conductive lines may be arranged in three layers outside the active area A/A and may be extended in different directions. In particular, if several conductive lines are connected to a pad in the pad area 120, the conductive lines may be extended different directions. If UV-curable sealant is formed on the conductive lines stacked in multiple layers and/or extended in different directions, the conductive lines may block UV light and adversely affect the curing of the sealant. Accordingly, it is important to arrange the conductive lines to obtain a UV transmissive area that is as large as possible, while considering the limited-sized bezel. That is, it is important to achieve high UV transmittance (or opening ratio) in the seal area where the sealant is formed. However, it is not a practical option to reduce the number of the lines on the substrate or to widen the spacing between the lines in order to increase UV transmittance, since there is the trend toward narrow bezel designs. In view of the above, the present disclosure proposes a unique structure for providing better UV transmittance in consideration of the conductive lines.

Figure 5:
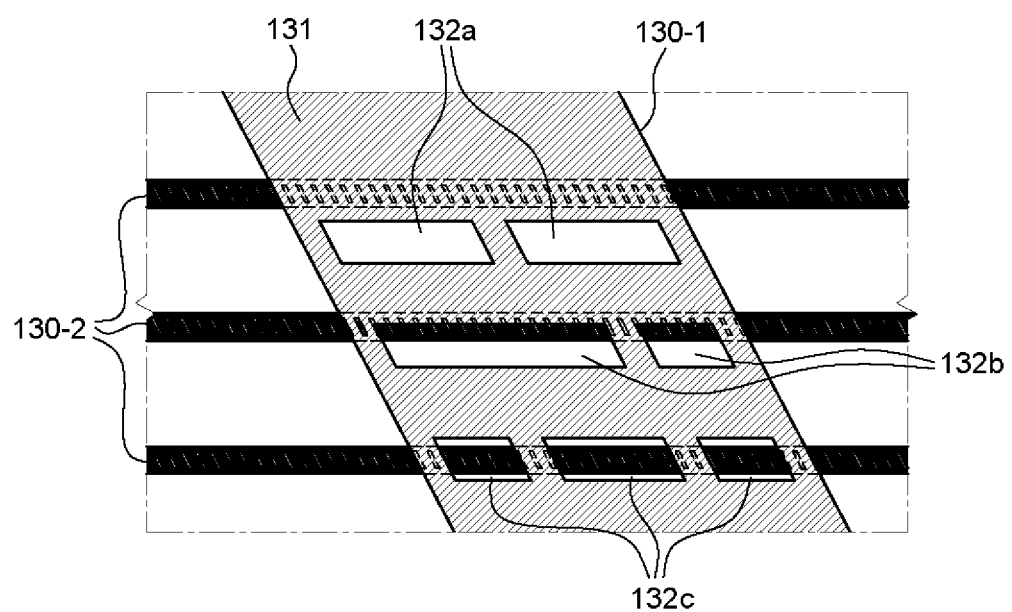
FIG. 5 is a diagram showing conductive lines arranged in a seal area according to an exemplary embodiment of the present disclosure.

FIG. 5 is a diagram showing conductive lines arranged in the seal area according to an exemplary embodiment of the present disclosure.

The seal area refers to the area where the sealant is placed (applied). In an LCD device, a plurality of conductive lines is arranged on a TFT array substrate. Some of the plurality of conductive lines and/or at least a part of one or more conductive lines may intersect (or overlap) the sealant. As described above with reference to FIGS. 2 and 3, the TFT array substrate is divided into the active area where images are displayed and the peripheral area around the active area, and some conductive lines or a part of a conductive line may intersect the sealant thereabove in the peripheral area. In the case that the sealant is a UV-curable resin cured by UV irradiation, UV light cannot go through the intersections, resulting in improper curing of the sealant at such locations.

According to the exemplary embodiment of the present disclosure, the LCD device includes a structure in which UV light irradiated for curing the sealant is not obstructed by the conductive lines overlapping the sealant. An example of the structure is a UV transmissive area that is included in the conductive line on the TFT array substrate. The transmissive area may be patterned on the conductive line as shown in FIG. 5. In particular, when the conductive lines are stacked in multiple layers, a conductive line in a first layer (upper layer) may have a transmissive area having a shape corresponding to the arrangement of a conductive line in a second layer (lower layer). That is, the transmissive area is formed such that the UV light irradiated for curing the UV-curable resin can effectively pass the conductive line in the first layer.

Referring to FIG. 5, a conductive line 130-1 in the first layer (upper layer) has a conductive area 131 and transmissive areas 132a, 132b and 132c. The conductive area 131 is made of a metallic material and electrical signals are transferred therethrough. The transmissive areas 132a, 132b and 132c can have the form of slits or other types of openings formed by removing the metallic material of the conductive area (via etching or some other appropriate removal process) to allow UV light to transmit therethrough.

The transmissive areas 132a, 132b and 132c may have a shape corresponding to the arrangement of the conductive lines 130-2 in the second layer (lower layer). That is, the transmissive areas 132a, 132b and 132c may be patterned on the conductive line 130-1 in the first layer in a shape parallel to the direction in which the conductive lines 130-2 in the second layer are extended, e.g., a rectangular shape, an oval shape, etc.

The transmissive area can be formed upon taking into account the efficiency of UV transmission. To this end, the relative positions of the conductive lines in the upper and lower layers are considered in determining the particular configuration (e.g. shape and/or location) of the transmissive area. That is, a conductive line in an upper layer has a transmissive area such that the conductive line does not block the UV light having transmitted between conductive lines or a transmissive area of a conductive line in a lower layer. Accordingly, the transmissive area of the conductive line in the upper layer does not completely overlap the conductive area (non-UV transmissive area) of the conductive line in the lower layer and is located where no conductive line is disposed or at least partially overlaps the transmissive area of the conductive line in the lower layer. In other words, the transmissive area at least partially includes a portion that does not overlap the conductive lines in the second layer (lower layer) in the direction in which the conductive lines are stacked on one another. As a result, the efficiency of UV transmission is higher when the transmissive areas are formed taking into account the arrangement of the conductive lines in the lower layer than when the transmissive areas are formed without taking into account the arrangement of the conductive lines in the lower layer.

Figure 6A:
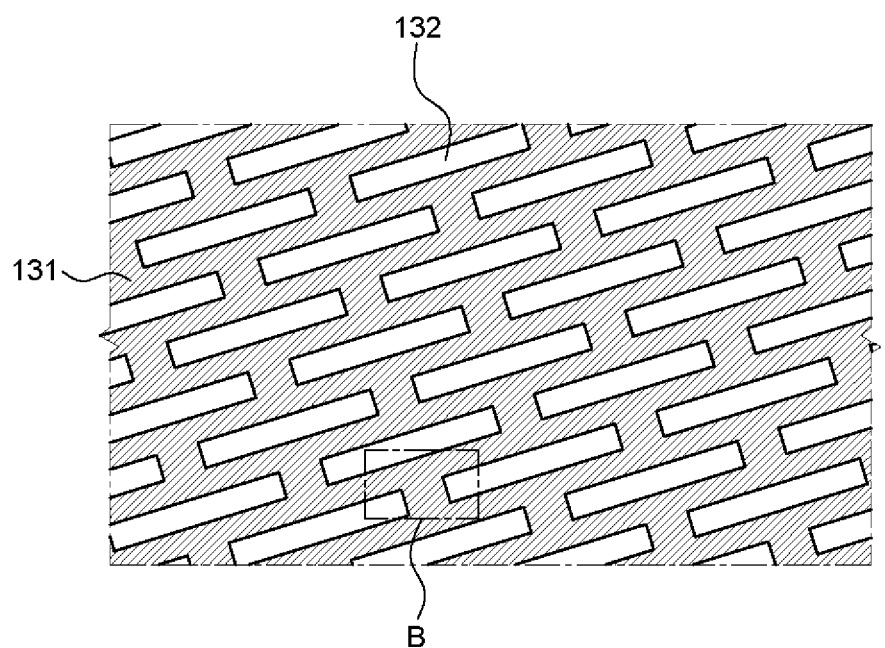
FIGS. 6A and 6B are enlarged views of a portion of a conductive line shown in FIG. 5.
Figure 6B:
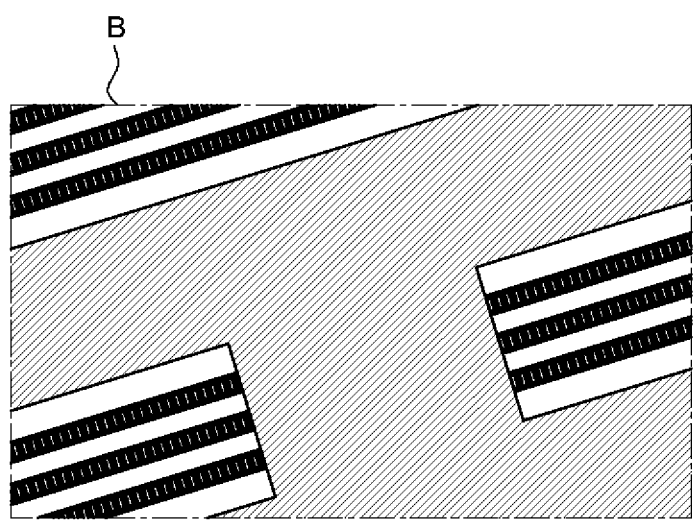

For example, the transmissive areas may be in a slit shape extended in parallel to the direction in which the conductive lines in the second layer are extended, when the relative positions of the conductive lines in the upper and lower layers are reflected in determining the shape/location of the transmissive area. As shown in FIG. 5, the transmissive areas 132a, 132b and 132c patterned on the conductive line 130-1 in the upper layer have a slit shape whose longer side is parallel to the direction in which the conductive lines 130-2 in the lower layer are extended, rather than the direction in which the conductive line 130-1 in the upper layer is extended. FIGS. 6A and 6B are enlarged views of the transmissive areas of such a conductive line. FIG. 6A shows a conductive line 130-1 among the conductive lines in the upper layer. FIG. 6B shows portion B of FIG. 6A. It can be seen from FIG. 6B that the conductive lines in the lower layer are extended in parallel with the transmissive areas (slits) thereunder.

It is to be noted that the transmissive areas may be located only at portions where the conductive lines in the first layer (upper layer) overlap the sealant, since the transmissive areas are provided to allow the UV light irradiated onto the sealant to transmit. That is, when viewed from the direction in which the conductive lines are stacked, the transmissive areas may be formed only at portions where the conductive lines in the first layer (upper layer) overlap the sealant. Such structure may be implemented in consideration of the electrical resistance of a conductive line being increased with the number of the transmissive areas.

If the transmissive areas are formed at a portion or the entirety of a conductive line, the area occupied by the transmissive areas may be determined based on the transmittance of UV light and/or increase in electrical resistance of the conductive line. For example, the transmissive areas may occupy three-fifth or five-sixth of the unit area of the conductive lines in the first layer. Of course, other proportions can be implemented, as long as the trade-off relationship between the amount of UV light penetration desired versus the undesirable increase in electrical resistance at the conductive lines is carefully considered. The specific trade-off considerations may depend upon certain characteristics of the display panel, such as its screen size, pixel resolution, the environment in which the display panel is to be subject to, and the like.

Furthermore, the conductive lines in the second layer (the lower layer) may also have transmissive areas to allow the UV light to transmit or pass therethrough. A conductive line in the bottom layer may have transmissive areas formed in an arbitrary (or in a specific) direction or the transmissive areas can be formed by taking into account the arrangement of the conductive lines in the upper layer.

It could be more effective to form the UV light transmissive areas on the conductive lines arranged where the pads are located. This is because a plurality of pads are typically disposed on one side of a TFT array substrate, and lines for transferring various control signals associated with displaying images are usually more densely disposed thereat.

The LCD device according to the exemplary embodiment of the present disclosure can include a thin-film transistor (TFT) array substrate, a color filter substrate, and a sealant for attaching the TFT array substrate and the color filter substrate together. The TFT array substrate can include a plurality of conductive lines extended below the sealant, and the conductive lines have transmissive portions through which UV light irradiated to cure the sealant passes. The plurality of conductive lines may connect a plurality of pads disposed on one side of the TFT array substrate to a display element.

When the plurality of conductive lines is arranged in multiple layers, a transmissive portion of a conductive line in an upper layer among the plurality of conductive lines arranged in multiple layers may have a slit shape corresponding to a direction in which a conductive line in a lower layer is extended. The transmissive portion of the conductive line in the upper layer may allow UV light incident on the upper layer and through the lower layer to be transmitted or passed to the sealant at an amount that is above a particular ratio. The transmissive portion of the conductive line in the upper layer may be disposed at a location corresponding to a transmissive portion of the conductive line in the lower layer or an area of the lower layer where no conductive line is disposed.

The exemplary embodiments of the present disclosure can also be described as follows.

According to an embodiment of the present disclosure, a TFT array substrate includes an active area where images are displayed and a peripheral area around the active area; and conductive lines configured to transfer signals associated with image displaying are stacked in multiple layers in the peripheral area, and a first conductive line in a first layer among the multiple layers has a transmissive area having a shape corresponding to an arrangement of a second conductive line in a second layer below the first layer.

A sealant configured to attach the TFT array substrate to another substrate may be located in the peripheral area above the conductive lines.

The sealant may be resin configured to be curable by UV light.

The transmissive area may be configured to allow UV light irradiated to cure the UV-curable resin to pass through portions of the conductive line in the first layer.

The transmissive area may at least partially include a portion that does not overlap the conductive line in the second layer in a stacked direction.

The transmissive area may have a slit shape that is extended in parallel with a direction in which the conductive line in the second layer is extended.

The transmissive area may be only at a portion where the conductive line in the first layer overlaps the sealant in the direction in which the conductive lines are stacked.

An area occupied by the transmissive area may be determined based on a trade-off relationship between transmittance of the UV light and an increase in electrical resistance of the conductive lines.

The transmissive areas may occupy three-fifth or five-sixth of the unit area of the conductive lines in the first layer.

The conductive line in the second layer may also have a transmissive area to allow the UV light to transmit therethrough.

According to another embodiment of the present disclosure, a liquid-crystal display (LCD) device comprises: a thin-film transistor (TFT) array substrate; a color filter substrate; and a sealant that attaches the TFT array substrate and the color filter substrate together, and the TFT array substrate includes a plurality of conductive lines extended below the sealant, and the conductive lines have transmissive portions through which UV light irradiated to cure the sealant is allowed to pass.

The TFT array substrate may comprise a plurality of pads on one side thereof, and the plurality of conductive lines may connect the plurality of pads to a display element.

The plurality of conductive lines may be configured to transfer control signals associated with displaying images.

The plurality of conductive lines may be arranged in multiple layers in a stacked manner, and a transmissive portion of a conductive line in an upper layer among the plurality of conductive lines arranged in the multiple layers may have a slit shape corresponding to a direction in which a conductive line in a lower layer is extended.

The transmissive portion of the conductive line in the upper layer may allow UV light incident on the upper layer through the lower layer to be transmitted to the sealant above a predetermined ratio.

The transmissive portion of the conductive line in the upper layer may be disposed at a location corresponding to a transmissive portion of the conductive line in the lower layer or an area of the lower layer where no conductive line is disposed.

The conductive line in the lower layer may have a transmissive area to allow the UV light to transmit therethrough.

The sealant may be a UV-curable resin that is cured by UV light.

An area occupied by the transmissive portions may be determined based on a transmittance of the UV light and increase in resistance of the conductive lines.

The transmissive portions may occupy three-fifth or five-sixth of a unit area of the conductive line in the first layer.

Thus far, exemplary embodiments of the present disclosure have been described in detail with reference to the accompanying drawings. However, the present disclosure is not limited to the exemplary embodiments, and modifications and variations can be made thereto without departing from the technical idea of the present disclosure. Accordingly, the exemplary embodiments described herein are merely illustrative and are not intended to limit the scope of the present disclosure. The technical idea of the present disclosure is not limited by the exemplary embodiments. Therefore, it should be understood that the above-described embodiments are not limiting but illustrative in all aspects. The scope of protection sought by the present disclosure is defined by the appended claims and all equivalents thereof are construed to be within the true scope of the present disclosure.

What is claimed is:

1. A liquid-crystal display (LCD) device comprising:
a thin-film transistor (TFT) array substrate;
a color filter substrate; and
a sealant that attaches the TFT array substrate and the color filter substrate together,
wherein the TFT array substrate comprises a plurality of conductive lines extended below the sealant,
wherein the plurality of conductive lines are arranged in multiple layers in a stacked manner, and the plurality of conductive lines have transmissive portions through which UV light irradiated to cure the sealant is allowed to pass,
wherein a transmissive portion of a conductive line in an upper layer among the plurality of conductive lines is at least partially overlapped with a corresponding transmissive portion of a conductive line in a lower layer or overlaps with an area of the lower layer where no conductive line is disposed,
wherein the conductive line in the upper layer and the conductive line in the lower layer are extended in different directions, and
wherein the transmissive portion of the conductive line in the upper layer has a slit shape that is extended in parallel with a direction in which the conductive line in the lower layer is extended.

2. The LCD device of claim 1, wherein the TFT array substrate comprises a plurality of pads on one side thereof, wherein the plurality of conductive lines connect the plurality of pads to a display element.

3. The LCD device of claim 2, wherein the plurality of conductive lines are configured to transfer control signals associated with displaying images.

4. The LCD device of claim 1, wherein the transmissive portion of the conductive line in the upper layer allows UV light incident on the upper layer through the lower layer to be transmitted to the sealant above a predetermined ratio.

5. The LCD device of claim 4, wherein all of the transmissive portion of the conductive line in the upper layer and the transmissive portion of the conductive line in the lower layer overlap with portions where the conductive line in the upper layer overlaps with the sealant.

6. The LCD device of claim 1, wherein the conductive line in the lower layer has a transmissive area to allow the UV light to transmit therethrough.

7. The LCD device of claim 1, wherein the sealant is a UV-curable resin that is cured by UV light.

8. The LCD device of claim 1, wherein an area occupied by the transmissive portions is determined based on a transmittance of the UV light and increase in resistance of the plurality of conductive lines.

9. The LCD device of claim 8, wherein the transmissive portions occupy three-fifth or five-sixth of a unit area of the conductive line in the upper layer.

10. A display device comprising:
a lower substrate;
an array of thin-film transistors (TFTs) on the lower substrate to control an array of sub-pixels for displaying images;
a plurality of conductive lines on the lower substrate to transfer signals related to displaying images to and from the TFTs; and
a sealant, along a periphery of the lower substrate, to provide an adhesive seal to an upper substrate with a liquid crystal material sandwiched between the lower and upper substrates,
the plurality of conductive lines having a multi-layer structure including a first set of lines and a second set of lines on different planar levels, respectively, the plurality of conductive lines having a particular layout and at least one among the first and second set of lines having transmissive portions,
whereby a combination of the particular layout and the transmissive portions allow ultraviolet irradiation to reach the sealant for curing thereof,
wherein the first set of lines and the second set of lines passing under the first set of lines are extended in different directions, and
wherein the transmissive portions in the first set of lines have a slit shape that is extended in parallel with a direction in which the second set of lines are extended.

11. The display device of claim 10, wherein a total area of the transmissive portions is based upon a trade-off relationship between transmittance of the ultraviolet irradiation and an increase in electrical resistance in the plurality of conductive lines.

12. The display device of claim 11, further comprising:
a pad area, at one side of the array of TFTs, that includes a plurality of pads at which at least some of the plurality of conductive lines are electrically connected to,
wherein at least some of the transmissive portions of at least some of the plurality of conductive lines are located in the pad area.

* * * * *